US011232445B2

(12) United States Patent
Kurian et al.

(10) Patent No.: US 11,232,445 B2
(45) Date of Patent: Jan. 25, 2022

(54) INTELLIGENT DYNAMIC AUTHENTICATION AND EVENT PROCESSING SYSTEM

(71) Applicant: Bank of America Corporation, Charlotte, NC (US)

(72) Inventors: Manu Kurian, Dallas, TX (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 62 days.

(21) Appl. No.: 16/117,136

(22) Filed: Aug. 30, 2018

(65) Prior Publication Data

US 2020/0074466 A1 Mar. 5, 2020

(51) Int. Cl.
*G06Q 20/40* (2012.01)

(52) U.S. Cl.
CPC .................... *G06Q 20/401* (2013.01)

(58) Field of Classification Search
CPC ...... G06F 17/60; G06Q 20/108; G06Q 40/00; G06Q 20/00; G06Q 20/401
See application file for complete search history.

(56) References Cited

U.S. PATENT DOCUMENTS

| 7,822,666 | B1 | 10/2010 | Bursch |
| 8,294,552 | B2 | 10/2012 | Beenau et al. |
| 8,336,091 | B2 | 12/2012 | Wong |
| 8,380,637 | B2 | 2/2013 | Levovilz |
| 8,442,894 | B2 | 5/2013 | Blackhurst et al. |
| 8,683,562 | B2 | 3/2014 | Ting et al. |
| 9,519,901 | B1 | 12/2016 | Dorogusker |
| 9,992,022 | B1 | 6/2018 | Chapman et al. |
| 10,104,059 | B2 * | 10/2018 | Hockey .............. H04L 9/3228 |
| 2001/0037290 | A1 * | 11/2001 | Lai .................... G06Q 20/24 705/39 |
| 2002/0004780 | A1 * | 1/2002 | Mizuta ................ G06Q 30/06 705/39 |

(Continued)

FOREIGN PATENT DOCUMENTS

CN 107181765 A 9/2017
WO WO-2017200753 A1 * 11/2017 ............. G06Q 40/00

*Primary Examiner* — Scott C Anderson
*Assistant Examiner* — Matthew Cobb
(74) *Attorney, Agent, or Firm* — Banner & Witcoff, Ltd.

(57) ABSTRACT

Systems for dynamic authentication and event processing are provided. In some examples, a system may receive a request to process an event. In response to receiving the request to process the event, the system may transfer an amount of funds associated with the event from a first account of a first user who is a party to the event to a second account. The system may generate a profile for each user who is a party to the event. In some examples, the information in a profile may be anonymized. Users who are parties to the event may use the profiles to authenticate and authorize or cancel the event. In some examples, a notification may be transmitted to the system that the event is authorized for processing. The amount of funds may be transferred from the second account to a third account associated with a second user who is a party to the event. If the event is cancelled, the funds may be transferred from the second, temporary account to the first account. In some examples, after the event has been processed or cancelled, the profiles may be deleted.

21 Claims, 13 Drawing Sheets

(56) References Cited

U.S. PATENT DOCUMENTS

| | | | | |
|---|---|---|---|---|
| 2002/0026575 A1* | 2/2002 | Wheeler | ............. | H04L 63/0823 |
| | | | | 713/156 |
| 2006/0085314 A1* | 4/2006 | Grim, III | ............... | G06Q 30/02 |
| | | | | 705/35 |
| 2007/0073618 A1* | 3/2007 | Yu | ...................... | G06Q 30/0609 |
| | | | | 705/40 |
| 2009/0106118 A1* | 4/2009 | Pelegero | ............ | G06Q 30/0601 |
| | | | | 705/26.1 |
| 2013/0346302 A1* | 12/2013 | Purves | .................. | G06Q 20/108 |
| | | | | 705/40 |
| 2015/0287255 A1 | 10/2015 | Hendrick | | |
| 2016/0217461 A1* | 7/2016 | Gaddam | ............. | G06Q 20/383 |
| 2016/0342988 A1* | 11/2016 | Thomas | ............. | G06Q 20/0855 |
| 2017/0004483 A1 | 1/2017 | Runyan et al. | | |
| 2017/0006010 A1* | 1/2017 | Miu | ...................... | H04L 63/105 |
| 2017/0024739 A1 | 1/2017 | Todasco et al. | | |
| 2017/0185979 A1* | 6/2017 | Lopez | ................... | G06Q 20/40 |
| 2017/0289127 A1 | 10/2017 | Hendrick | | |
| 2018/0253727 A1* | 9/2018 | Ortiz | ................... | G06Q 20/325 |

* cited by examiner

PROFILE 2 450

FIRST NAME 2 LAST NAME 2

ACCOUNT: CHECKING YYYY

AMOUNT: $1,500

PHONE: ZZZ.ZZZ.ZZZZ

FIG. 4B

PROFILE 1 400

FIRST NAME 1 LAST NAME 1

ACCOUNT: CHECKING XXXX

AMOUNT: $1,500

PHONE: XXX.XXX.XXXX

PROFILE 2

NAME: E9UR(*&8EFUR8

ACCOUNT: FGJERJ90FI

AMOUNT: $1,500

PHONE: XXX.XXX.XXXX

PROFILE 1

NAME: ASDOJIGF3478FYU

ACCOUNT: ASOIDUJF89TRH

AMOUNT: $1,500

PHONE: JDFFI90PU3

FIG. 5A

INTELLIGENT DYNAMIC AUTHENTICATION AND EVENT PROCESSING SYSTEM

BACKGROUND

Aspects of the disclosure relate to electrical computers, systems, and machine learning. In particular, one or more aspects of the disclosure relate to dynamically authenticating users and processing events.

Event processing is an everyday occurrence for many people. However, these days event processing does not only occur between a vendor or other commercial entity and a user. Instead, many events occur between two private users (e.g., a private sale of goods). In conventional arrangements, events processed between two individual users do not include aspects directed to maintaining privacy or anonymity of the user, protecting payment information, and the like. Accordingly, it would be advantageous to provide a system for authenticating users and securely processing events, particularly events between two or more private users.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with securely processing events.

In some examples, a system, computing platform, or the like, may receive a request to process an event. The event processing request may include details of the event, personal or identifying information of users who are parties to the event, and the like. In response to receiving the request to process the event, the system, computing platform or the like may transfer an amount of funds associated with the event from a first account of a first user who is a party to the event to a second, temporary account. Further, the system, computing platform, or the like may generate a digital identity or profile for each user who is a party to the event. The digital identity or profile may include information associated with the user, payment or account information, an amount of the event, and the like. In some examples, the information may be anonymized.

Users who are parties to an event being processed may then use the digital identity profiles to authenticate and authorize or cancel the event. For instance, if each party agrees to process the event, each party may transmit his or her respective profile to the other party. In some examples, the profiles and/or a notification may be transmitted to the system, computing platform, or the like, that the event is authorized for processing. Accordingly, the amount of funds may be transferred from the second, temporary account to a third account associated with a second user who is a party to the event. If, alternatively, the event is cancelled or a predetermined time period expires, the funds may be transferred from the second, temporary account to the first account. In some examples, after the event has been processed or cancelled, the profiles may be deleted.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A and 4B illustrate example user interfaces in accordance with one or more aspects described herein;

FIGS. 5A and 5B illustrate example user interfaces in accordance with one or more aspects described herein;

DETAILED DESCRIPTION

Figure 1A:
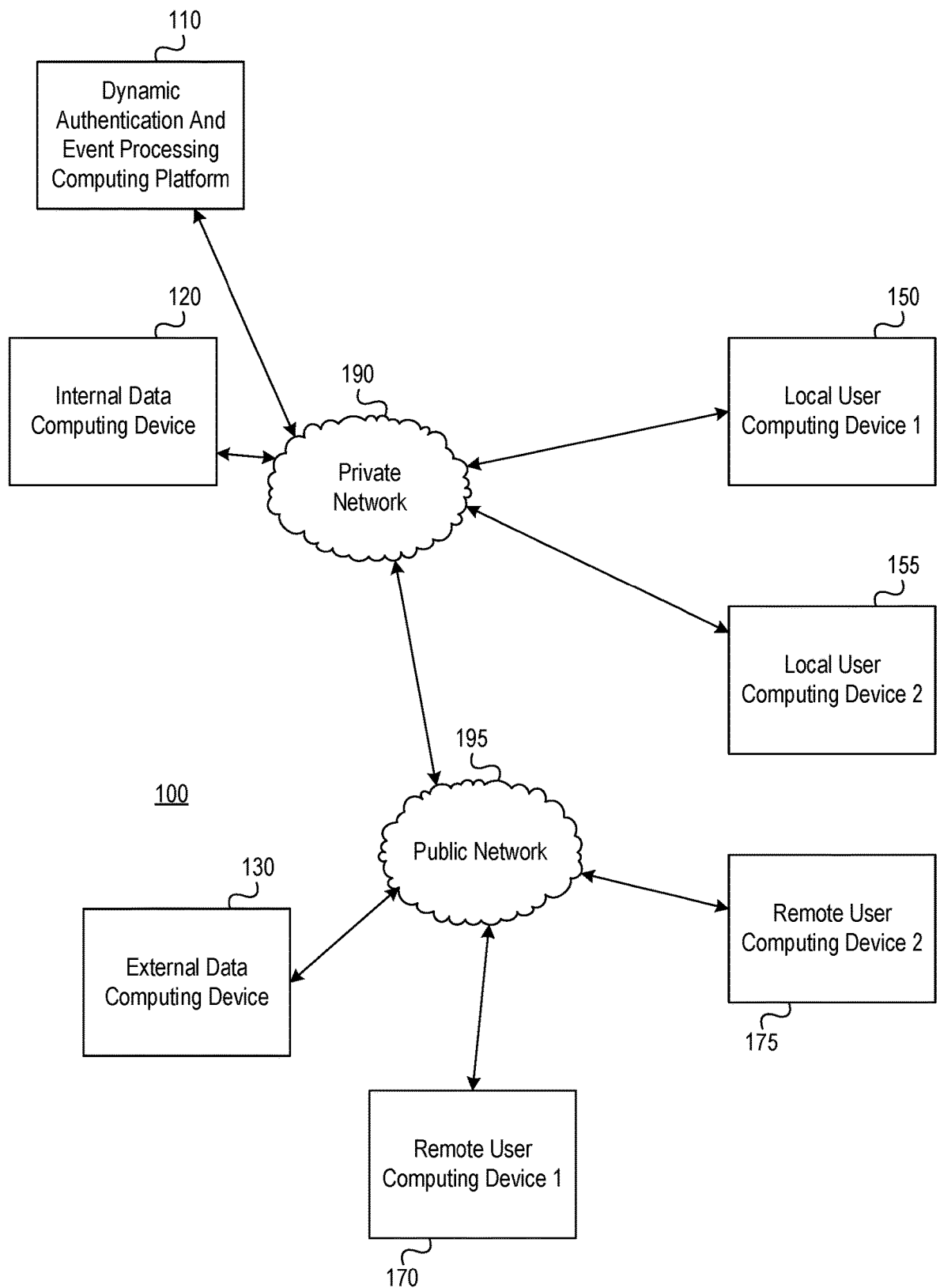
FIGS. 1A and 1B depict an illustrative computing environment for implementing dynamic authentication and event processing functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically authenticating users and processing events.

As mentioned above, users process several different types of events on a daily basis. Event processing has become quite prevalent in society today and now occurs not just between a vendor, service provider, or other commercial entity, but between two users. Accordingly, safeguards in place to protect user information, privacy, and the like, are often not available when an event is being processed between two individual or personal users, rather than between a user and an entity. Accordingly, systems for providing secure event processing between users and protecting user information and privacy would be advantageous.

Accordingly, aspects described herein are related to dynamically authenticating users and processing events. In some examples, a temporary account, similar to an escrow account used in real estate purchases, may be used to hold funds in anticipation of an event being processed. For instance, if a first user desires to purchase an item from a second user, the first user may transfer an amount of funds associated with the purchase from his or her account to the second, temporary account (e.g., "escrow" account) to securely hold the funds until the event is processed. This may provide security for both the buyer and the seller in that the seller can be certain the funds are available and the buyer does not have to release the funds until he or she is certain of the purchase, goods, or the like.

In some examples, the system may generate digital identities or profiles for each user who is a party to the event. The profiles may include information associated with the user, such as name, account, contact information, and the like. In some examples, the profile may include the amount associated with the event being processed. The profile, or data therein, may include a token or other device for authenticating the profile and/or associated user, as well as for authorizing or cancelling the requested event.

In some examples, each user may transmit his or her respective digital identity or profile to the other user and/or to the system, in order to authenticate the user and authorize or cancel the requested event. If the users are authenticated and the event is authorized, the system may generate and execute instructions to transfer the amount of the funds from the second, temporary account to a third account (e.g., associated with the second user or seller). If the event is cancelled, or if a predetermined time period has elapsed, the event will not be processed and the system may generate and execute and instruction to transfer the amount of funds from the second, temporary account to the first account.

In some examples, the digital identities or profiles may be generated for a single user. Accordingly, upon processing the event, cancelling the event or expiration of the designated time period, the generated profiles may be deleted by the system. Accordingly, any subsequent receipt of the profiles cannot be used to process events because authenticating data will have been deleted. In some examples, the system may generate and transmit instructions to the respective mobile devices of the users to delete the profiles thereon. Alternatively, a profile may be used more than once and can be deleted after a predetermined time period, number of uses, or the like.

These and various other arrangements will be discussed more fully below.

Figure 1B:
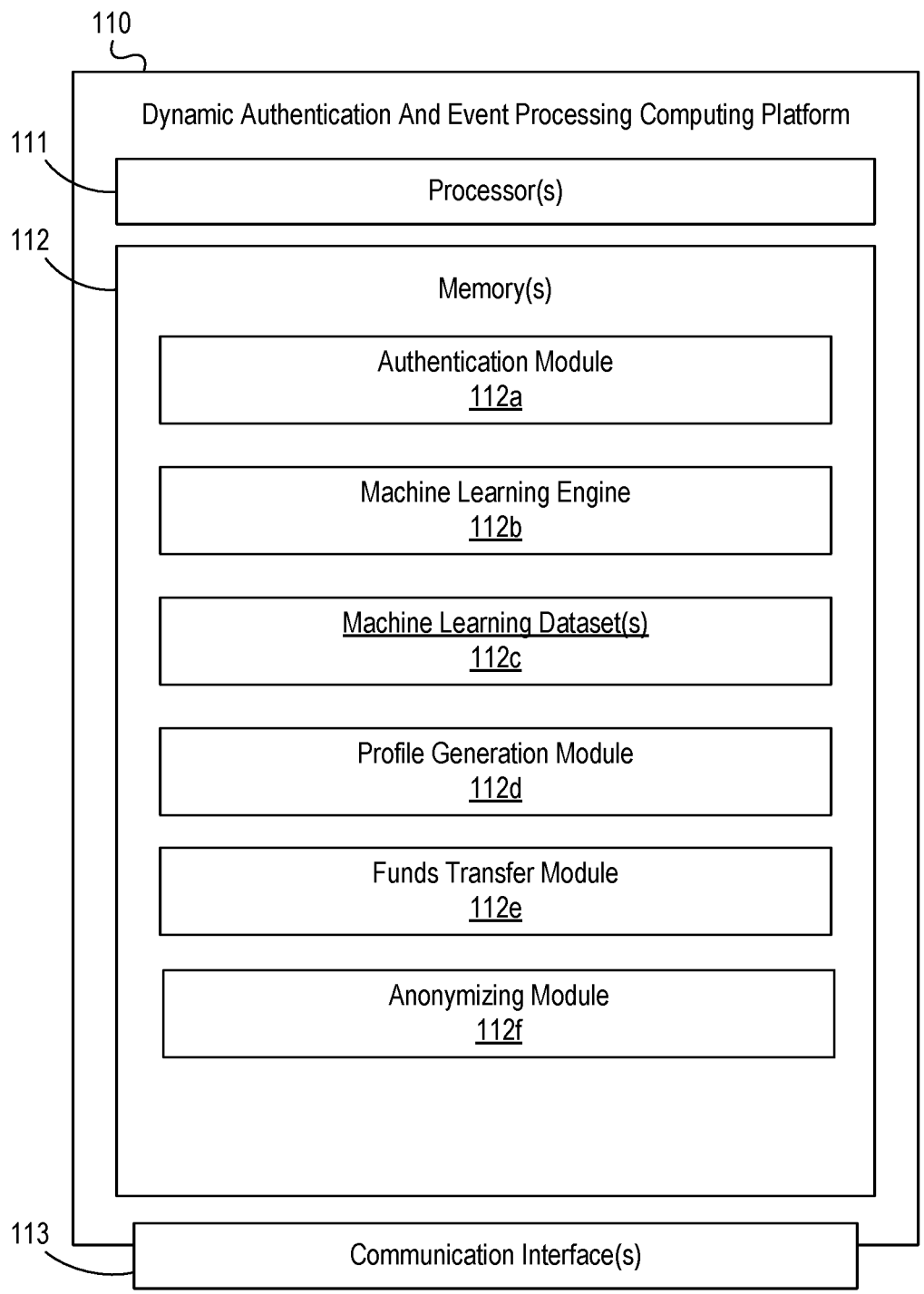

FIGS. 1A and 1B depict an illustrative computing environment for implementing and using a system for dynamic authentication and event processing in accordance with one or more aspects described herein. Referring to FIG. 1A, computing environment 100 may include one or more computing devices and/or other computing systems. For example, computing environment 100 may include a dynamic authentication and event processing computing platform 110, an internal data computing device 120, external data computing device 130, a first local user computing device 150, a second local user computing device 155, a first remote user computing device 170, and a second remote user computing device 175.

Dynamic authentication and event processing computing platform 110 may be configured to host and/or execute a machine learning engine to provide intelligent, dynamic authentication and event processing functions. In some examples, a request to process an event may be received. For instance, a user may transmit, from a user device, such as a mobile device of the user, a request to process an event. In some examples, processing the event may include processing a transaction between two parties. For instance, if one party wishes to purchase something from another party, one of the parties may request event processing.

Upon receiving the event processing request, the dynamic authentication and event processing computing platform 110 may authenticate the user requesting event processing. Upon authenticating the user, the dynamic authentication and event processing computing platform may generate a digital identity or profile for a first party to the event and a digital identity or profile for a second party to the event. In some examples, the digital identities or profiles may be anonymized after being generated. Accordingly, each digital identity or profile may be transmitted to a user device of a respective party. The anonymized profiles may provide sufficient information to complete the requested event without disclosing personal or other identifying information associated with either party. In some examples, one or more users may select a level of anonymization (e.g., identify particular data fields to be anonymized) to control the information transmitted at a more granular level.

The parties may then use the generated digital identities or profiles as tokens in order to authenticate and complete processing of an event. For instance, a first party (e.g., a buyer) may transmit a request to transfer an amount of funds from a first account of the first party to a second, temporary account. In some examples, the second temporary account may be an account of an independent third party (e.g., an account provided by a financial institution as a holding account for processing events). The second, temporary account might not be associated with either the first party or the second party. In some examples, the amount of funds may be transferred from the first account to the second account and held in the second account until a triggering event occurs.

For instance, in some examples, a triggering event may include both parties providing their respective digital identity or profile as a token to authenticate the user and authorize completion of the event processing. Upon receiving both profiles or authorization from both profiles to process the event, the amount of funds may be transferred from the second, temporary account to a third account associated with the second party and the profiles may be deleted (e.g., no longer available for use).

In other examples, a triggering event may include expiration of a predetermined amount of time to hold the amount of funds. If the time period expires, the amount of funds may be transferred back to the first account and the profiles may be deleted (e.g., no longer available for use).

In still other examples, a triggering event may include a user requesting cancellation of processing of the event. For instance, if a user receives goods and they are damaged or are not the expected goods, the user (e.g., the buyer) may cancel the event and the amount of funds may be transferred back to the first account and the digital identities or profiles may be deleted. In some examples, the system may provide one or more users with options for reason codes or types of reasons for which an event may be cancelled.

Various other triggering events may be used without departing from the invention.

Upon occurrence of the triggering event, the amount of funds may be transferred to the first account, third account, or another account and the event may be processed or cancelled.

In some examples, the dynamic authentication and event processing computing platform 110 may use machine learning to authenticate a user, generate a digital identity or profile, process and event, and the like, as will be discussed more fully herein.

Internal data computing device 120 may be configured to store, transmit, and/or receive data associated with one or more internal data or computer systems. For instance, an entity implementing the dynamic authentication and event processing computing platform 110 may store data associated with various users, account information, contact information, mobile device identifying information (e.g., international mobile equipment identity (IMEI)), event processing history including, for instance, transaction history, and the like. The internal data computing device 120 may retrieve data from one or more databases or other data storage locations within the entity implementing the dynamic authentication and event processing computing platform 110.

External data computing device 130 may be configured to store, transmit, and/or receive data associated with one or more data or computer systems external to the entity implementing the dynamic authentication and event processing computing platform 110. For instance, data, such as publicly available data, event data including, for instance, transaction data (e.g., user transactions not associated with the entity), user demographic data, social media data, market data, location data (e.g., global positioning system (GPS) data from a user mobile device), account information for accounts held at a financial institution other than the entity implementing the dynamic authentication and event processing computing platform 110, and the like, may be transmitted, via the external data computing device 130, from one or more data or computer systems, to the dynamic authentication and event processing computing platform 110.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the dynamic authentication and event processing computing platform 110 to control parameters of the system, update rules, modify settings, and the like.

The remote user computing devices 170, 175 may be used to communicate with, for example, dynamic authentication and event processing computing platform 110, receive and/or transmit requests for event processing, receive and/or transmit profiles or profile data for authentication, to authorize or cancel event processing and the like. In some examples, remote user computing devices 170, 175 may be mobile devices of users that are parties to the event being processed. For instance, remote user computing device 170 may be a mobile computing device of a user who is a first party to the event and remote user computing device 175 may be a mobile computing device of a user who is a second or different party to the event.

In one or more arrangements, internal data computing device 120, external data computing device 130, local user computing device 150, local user computing device 155, remote user computing device 170, and/or remote user computing device 175 may be any type of computing device or combination of devices capable of performing the particular functions described herein. For example, internal data computing device 120, external data computing device 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing device 120, external data computing device 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic authentication and event processing computing platform 110. As illustrated in greater detail below, dynamic authentication and event processing computing platform 110 may include one or more computing devices configured to perform one or more of the functions described herein. For example, dynamic authentication and event processing computing platform 110 may include one or more computers (e.g., laptop computers, desktop computers, servers, server blades, or the like).

As mentioned above, computing environment 100 also may include one or more networks, which may interconnect one or more of dynamic authentication and event processing computing platform 110, internal data computing device 120, external data computing device 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic authentication and event processing computing platform 110, internal data computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic authentication and event processing computing platform 110, internal data computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic authentication and event processing computing platform 110, internal data computing device 120, local user computing device 150, local user computing device 155) with one or more networks and/or computing devices that are not associated with the organization. For example, external data computing device 130, remote user computing device 170, and/or remote user computing device 175 might not be associated with an organization that operates private network 190 (e.g., because external data computing device 130, remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect external data computing device 130, remote user computing device 170 and remote user computing device 175 to private network 190 and/or one or more computing devices connected thereto (e.g., dynamic authentication and event processing computing platform 110, internal data computing device 120, local user computing device 150, local user computing device 155).

Referring to FIG. 1B, dynamic authentication and event processing computing platform 110 may include one or more processors 111, memory 112, and communication interface 113. A data bus may interconnect processor(s) 111, memory 112, and communication interface 113. Communication interface 113 may be a network interface configured to support communication between dynamic authentication and event processing computing platform 110 and one or more networks (e.g., private network 190, public network 195, or the like). Memory 112 may include one or more program modules having instructions that when executed by processor(s) 111 cause dynamic authentication and event processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic authentication and event processing computing platform 110 and/or by different computing devices that may form and/or otherwise make up dynamic authentication and event processing computing platform 110.

For example, memory 112 may have, store, and/or include an authentication module 112a. Authentication module 112a may store instructions and/or data that may cause or enable the dynamic authentication and event processing computing platform 110 to receive a request to authenticate a user and process the request. For instance, the authentication module 112a may receive a request to authenticate a user or process an event from a computing device, such as local user computing devices 150, 155 or remote user computing devices 170, 175. In some examples, the request to authenticate a user may include user credentials, such as username, password, biometric data, or the like. This data may be compared to pre-stored data to determine whether the user is authenticated. If so, additional functionality of the dynamic authentication and event processing computing platform 110 may be enabled or activated.

Additionally or alternatively, the authentication module 112a may evaluate profiles or profile data received in response to event processing requests and provided for authentication of users in order to complete processing an event. For instance, users may each receive a unique profile that may include data (e.g., profile data, token data, or the like) that may be used to authenticate the user as a party to the event and also to authorize or cancel the event being processed, as will be discussed more fully herein. The authentication module 112a may compare profiles or profile data to profiles and profile data generated by, for instance, profile generation module 112d, to authenticate a user and authorize or cancel the event being processed.

Dynamic authentication and event processing computing platform 110 may further have, store and/or include a machine learning engine 112b and machine learning datasets 112c. Machine learning engine 112b and machine learning datasets 112c may store instructions and/or data that may cause or enable dynamic authentication and event processing computing platform 110 to receive data from a plurality of sources (e.g., internal data computing device 120, external data computing device 130, and the like) to generate one or more user profiles or profile data that may be used to authenticate a user and/or process an event. The machine learning datasets 112c may be generated based on analyzed data (e.g., data from previously received data, data from internal data computing device 120, data from external data computing device 130, and the like), raw data, and/or received from one or more outside sources.

The machine learning engine 112b may receive data (e.g., data from internal data computing device 120, external data computing device 130, and the like) and, using one or more machine learning algorithms, may generate one or more machine learning datasets 112c. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112b may analyze data to identify patterns of activity, sequences of activity, and the like, to generate one or more machine learning datasets 112c.

The machine learning datasets 112c may include machine learning data linking one or more user characteristics, data elements, or the like to a user, user profile, or the like. Accordingly, the machine learning datasets 112c may be used to dynamically generate user profiles or profile data in response to a request to process an event.

The machine learning datasets 112c may be updated and/or validated based on subsequent data received, for example, after an event has been processed or cancelled, after funds have been transferred, and the like.

The machine learning datasets 112c may be used by, for example, profile generation module 112d. Profile generation module 112d may have or store instructions and/or data that may cause or enable the dynamic authentication and event processing computing platform 110 to generate one or more profiles or profile data for each user that is a party to the event being processed. For instance, if user 1 requests to make a purchase from user 2, one of user 1 or user 2 may, via his or her respective mobile device, request event processing functionality from the dynamic authentication and event processing computing platform 110. Responsive to receiving the request for event processing, which may include data identifying the user, user devices, and the like, and authenticating the user, the profile generation module 112d may generate digital identities or profiles for each of user 1 and user 2. The digital identities or profiles may include data retrieved from one or more of internal data computing device 120, external data computing device 130, or the like. For instance, the profile may include account information for each user, balances in accounts, contact information for the user, a user rating (if any) and the like. As discussed above, machine learning may be used to generate the profile by linking data associated with a user with one or more profiles. In some examples, behavioral data (e.g., buying habits, or the like) may be generated using machine learning and included in the user profiles.

In some examples, the generated digital identities or profiles may be single-use profiles. For instance, the digital identities or profiles may be used to authenticate the user and/or authorize or cancel the requested event for only the requested event. After the event is processed or cancelled, after expiration, or the like, the generated profiles may be deleted (e.g., no longer available for user). If subsequent events are requested, new digital identities or profiles may be generated at that time.

In some arrangements, profiles and/or profile data may be used multiple times before being deleted. For instance, the profile may be generated for a user and may include a token or other authentication device that may be generated upon each requested use of the profile. Accordingly, while portions of the profile data may be reused, the token used for authentication may be generated and used for the requested event (in some examples, only the requested event).

The digital identities or profiles may include one or more unique identifiers generated for the particular event and stored by the profile generation module in addition to being associated with the profile. Accordingly, the user may provide his or her respective profile to, for instance, the other party via his or her mobile device, to an entity for processing the event, or the like, to authenticate and/or authorize or cancel the event and the unique identifier may be compared to the pre-stored unique identifier to authenticate the user/profile.

Dynamic authentication and event processing computing platform 110 may further have, store and/or include a funds transfer module 112e. Funds transfer module 112e may have or store instructions and/or data that may cause or enable the dynamic authentication and event processing computing platform 110 to transfer funds between accounts based on various triggering events. For instance, upon requesting to process an event, a user may identify an amount associated with the event and a first account from which funds should be transferred for payment. The funds transfer module 112e may, after a profile is generated and transmitted, generate and transmit instructions causing the designated amount for payment to be transferred from the first account to a second, temporary account. In some examples, the second, temporary account may be managed or provided by the entity implementing the dynamic authentication and event processing computing platform 110. For instance, the second, temporary account may be stored in a system of the entity, or may be stored in the funds transfer module 112e.

Further, the funds transfer module may be configured to store the funds in the second, temporary account until another triggering event has occurred. For instance, if the event us authorized for processing (e.g., both parties agree to process the event), that triggering event may cause the funds transfer module 112e to generate and transmit an instruction causing the designated amount of funds to be transferred from the second, temporary account to a third account (e.g., an account associated with the selling party and, in some examples, identified via the profile of the selling party).

In another example, if the triggering event is cancellation of the event, the funds transfer module 112e may generate and transmit an instruction causing the designated amount of funds to be transferred from the second, temporary account to the first account.

Dynamic authentication and event processing computing platform 110 may further have, store and/or include anonymizing module 112f. Anonymizing module 112f may have or store instructions and/or data that may cause or enable the dynamic authentication and event processing computing platform 110 to anonymize some or all of the data in the user profile. For instance, the user profile may be transmitted from one user to another (e.g., from buyer to seller or vice versa) to authenticate the user in processing the event and to authorize or cancel the event. Accordingly, in some examples, profile data for a first user may be displayed on a mobile device of a second user. In some arrangements, one or more users may request that data associated with the profile be anonymized in order to control access to private data or information.

For instance, a user may request that his or her name, contact information and/or account information be anonymized. In response to the request, the system may generate a random code or identifier (e.g., an alphanumeric string) representing the data in the profile (e.g., each data field being anonymized may be converted to a random code or identifier). The anonymizing module 112f may store information linking the user data to the random codes or identifiers generated (e.g., via a look-up table or other storage arrangement). Accordingly, upon receiving a profile with anonymized data, the anonymizing module 112f may use the random codes or identifiers to look up the user's personal information and the event may be processed based on the user information extracted from the look up table based on the random codes.

Although a user may request to anonymize data when event processing is requested, in some examples, a user may pre-select an option to always have data anonymized. In some arrangements, the user may select particular data fields for anonymizing, or may select to anonymize all data, as desired.

FIGS. 2A-2F depict an illustrative event sequence for implementing and using dynamic authentication and event processing functions in accordance with one or more aspects described herein. The events shown in the illustrative event sequence are merely one example sequence and additional events may be added, or events may be omitted, without departing from the invention.

Figure 2A:
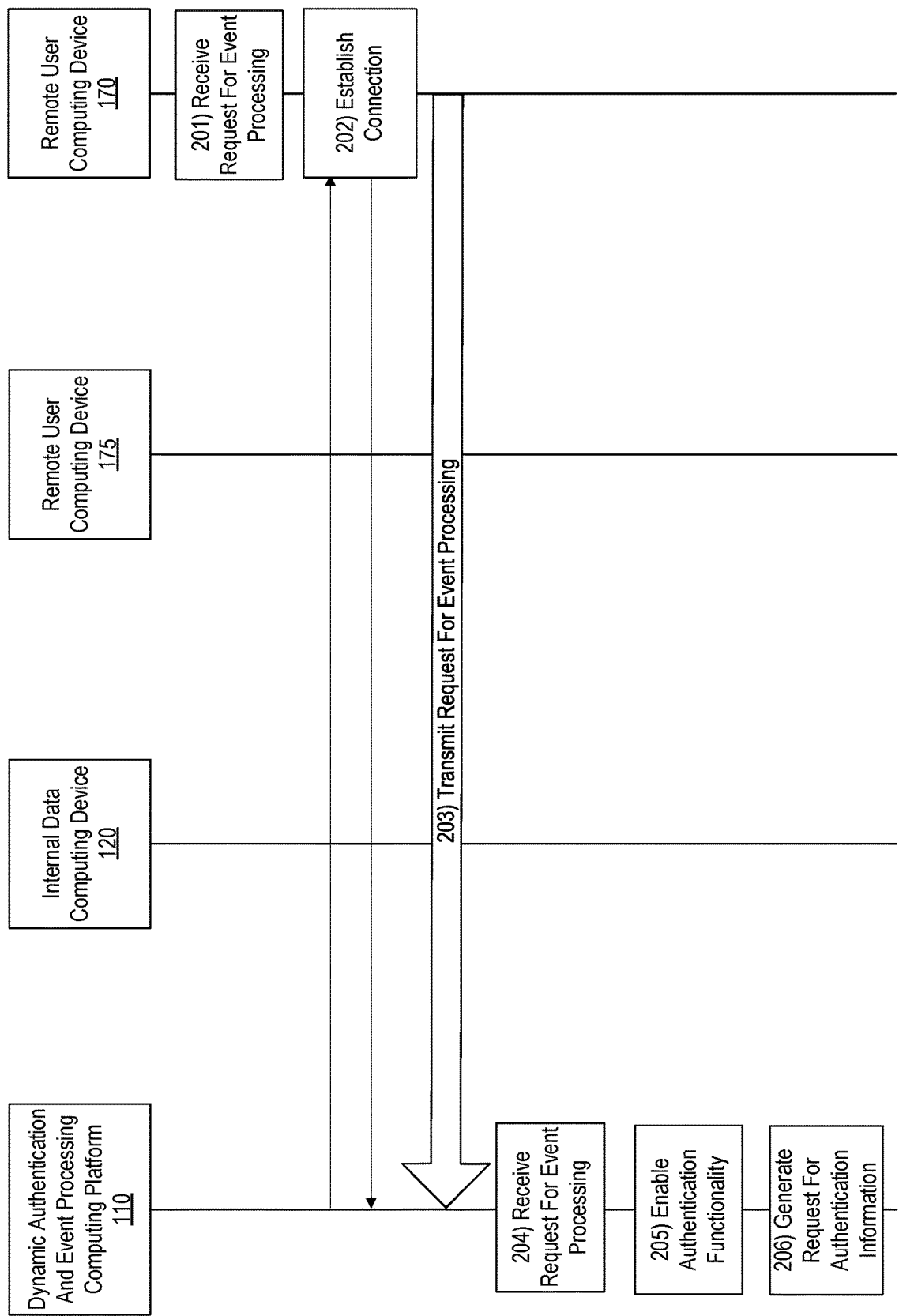
FIGS. 2A-2F depict an illustrative event sequence for implementing dynamic authentication and event processing functions in accordance with one or more aspects described herein.

Referring to FIG. 2A, at step 201, a request to process an event may be received. For instance, the request may be received from a user computing device, such as remote user computing device 170. The remote user computing device 170 may be a mobile computing device associated with a user who is a first party to the event (e.g., buyer, seller, or the like).

At step 202, a connection may be established between the remote user computing device 170 and the dynamic authentication and event processing computing platform 110. For instance, a first wireless connection may be established between the remote user computing device 170 and the dynamic authentication and event processing computing platform 110. Upon establishing the first wireless connection, a communication session may be initiated between the dynamic authentication and event processing computing platform 110 and the remote user computing device 170.

At step 203, the received request for event processing may be transmitted from the remote user computing device 170 to the dynamic authentication and event processing computing platform 110. In some examples, the request to process the event may include additional information, such as an amount of event, type of event, other party to the event, contact information for the other party (e.g., mobile device number), and the like.

At step 204, the request for event processing may be received by the dynamic authentication and event processing computing platform 110 and, at step, 205, authentication functionality may be enabled. For instance, one or more functions associated with authentication may be enabled, activated or initiated by the dynamic authentication and event processing computing platform 110 (e.g., functions that were previously disabled or not available).

At step 206, a request for authentication information may be generated. In some examples, the request may include a request for a username, password, biometric data, personal identification number (PIN), or the like. For instance, a user may pre-register with the system to use the event processing functionality and may establish login credentials in order to request event processing. At step 206, a request for a user to provide login or other authentication credentials may be generated.

Figure 2B:
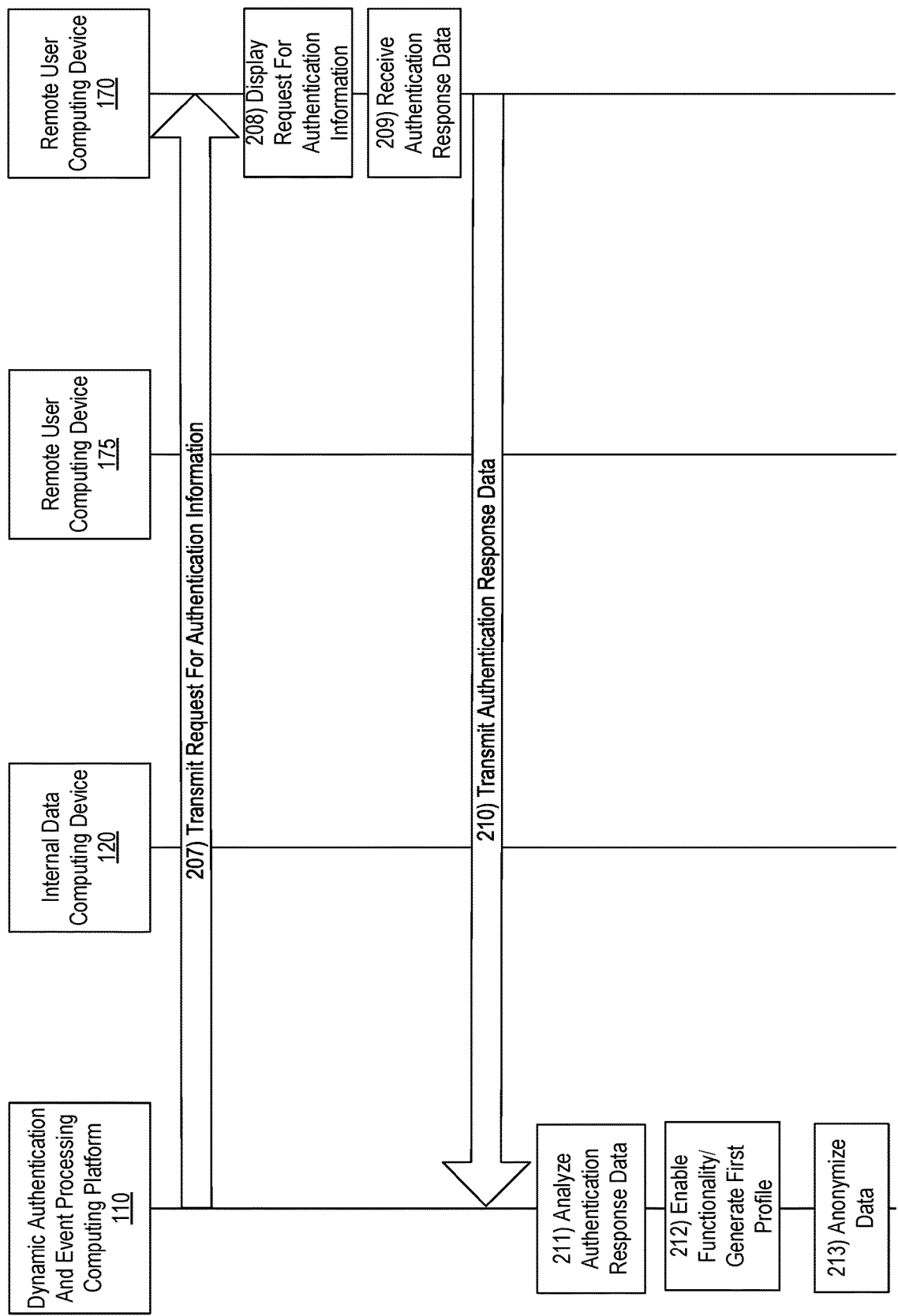

With reference to FIG. 2B, at step 207, the request for authentication information may be transmitted to the remote user computing device 170. In some examples, the request for authentication information may be transmitted during the communication session initiated when the first wireless communication session was established.

At step 208, the request for authentication information may be received and displayed by the remote user computing device 170. At step 209, authentication response data may be received by the remote user computing device 170. For instance, in response to the displayed request for authentication information, the user may input response data to the remote user computing device 170, such as username, password, PIN, or the like.

At step 210, the authentication response data may be transmitted from the remote user computing device 170 to the dynamic authentication and event processing computing platform 110. At step 211, the authentication response data may be received by the dynamic authentication and event processing computing platform 110 and may be analyzed to determine whether the response data matches pre-stored authentication data (e.g., whether a username, PIN, password, or the like matches pre-stored data).

If the received authentication response data does not match pre-stored data, the user might not be authenticated and, instead, a notification may be transmitted to the remote user computing device 170 denying or preventing the processing of the requested event and/or providing a notification that the user was not authenticated.

If the received authentication response data does match pre-stored data, the dynamic authentication and event processing computing platform 110 may enable, activate or initiate event processing functionality in step 212. Enabling event processing functionality may include generating one or more digital identities or profiles for each user who is a party to the event. For instance, if the event is sale of a product between user 1 and user 2, a digital identity or profile may be generated for each of user 1 and user 2. As discussed herein, the profile may be used to further authenticate a user and/or authorize or cancel the event. At step 212, a first profile may be generated for a first user.

At step 213, data in the generated digital identities or profiles may be anonymized. For instance, if desired, the dynamic authentication and event processing computing platform 110 may anonymize some or all of the data appearing in the profile, as discussed above.

Figure 2C:
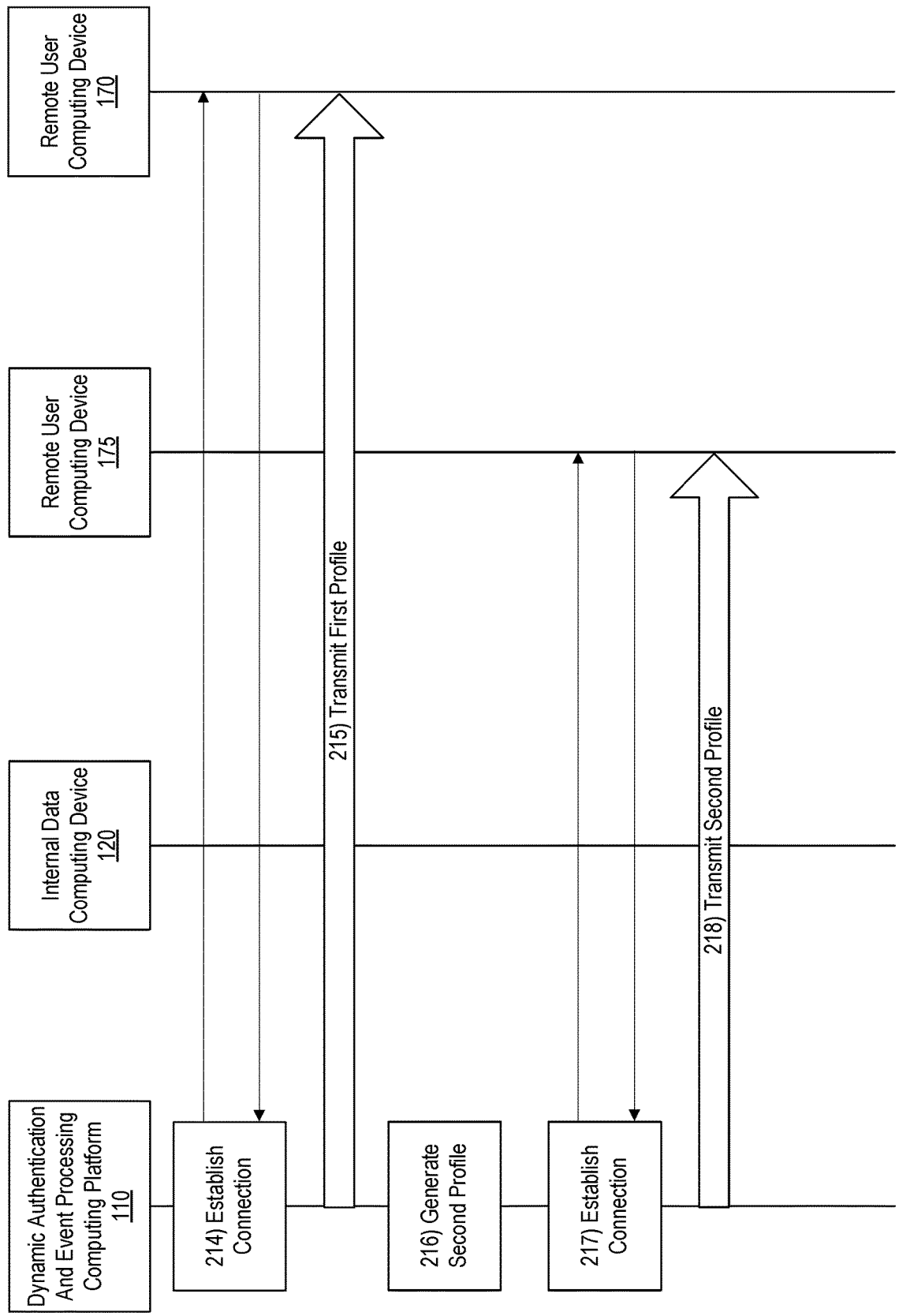

With reference to FIG. 2C, at step 214, a connection may be established between the remote user computing device 170 and the dynamic authentication and event processing computing platform 110. For instance, a second wireless connection may be established between the remote user computing device 170 and the dynamic authentication and event processing computing platform 110. Upon establishing the second wireless connection, a communication session may be initiated between the dynamic authentication and event processing computing platform 110 and the remote user computing device 170.

At step 215, the first profile may be transmitted from the dynamic authentication and event processing computing platform 110 and the remote user computing device 170. For instance, the first profile may be transmitted during the communication session established by the second wireless connection.

At step 216, the second profile for the second user may be generated by the dynamic authentication and event processing computing platform 110.

At step 217, a connection may be established between the remote user computing device 175 and the dynamic authentication and event processing computing platform 110. For instance, a third wireless connection may be established between the remote user computing device 175 and the dynamic authentication and event processing computing platform 110. Upon establishing the third wireless connection, a communication session may be initiated between the dynamic authentication and event processing computing platform 110 and the remote user computing device 175.

At step 218, the second profile may be transmitted from the dynamic authentication and event processing computing platform 110 and the remote user computing device 175. For instance, the second profile may be transmitted during the communication session established by the second wireless connection.

Figure 2D:
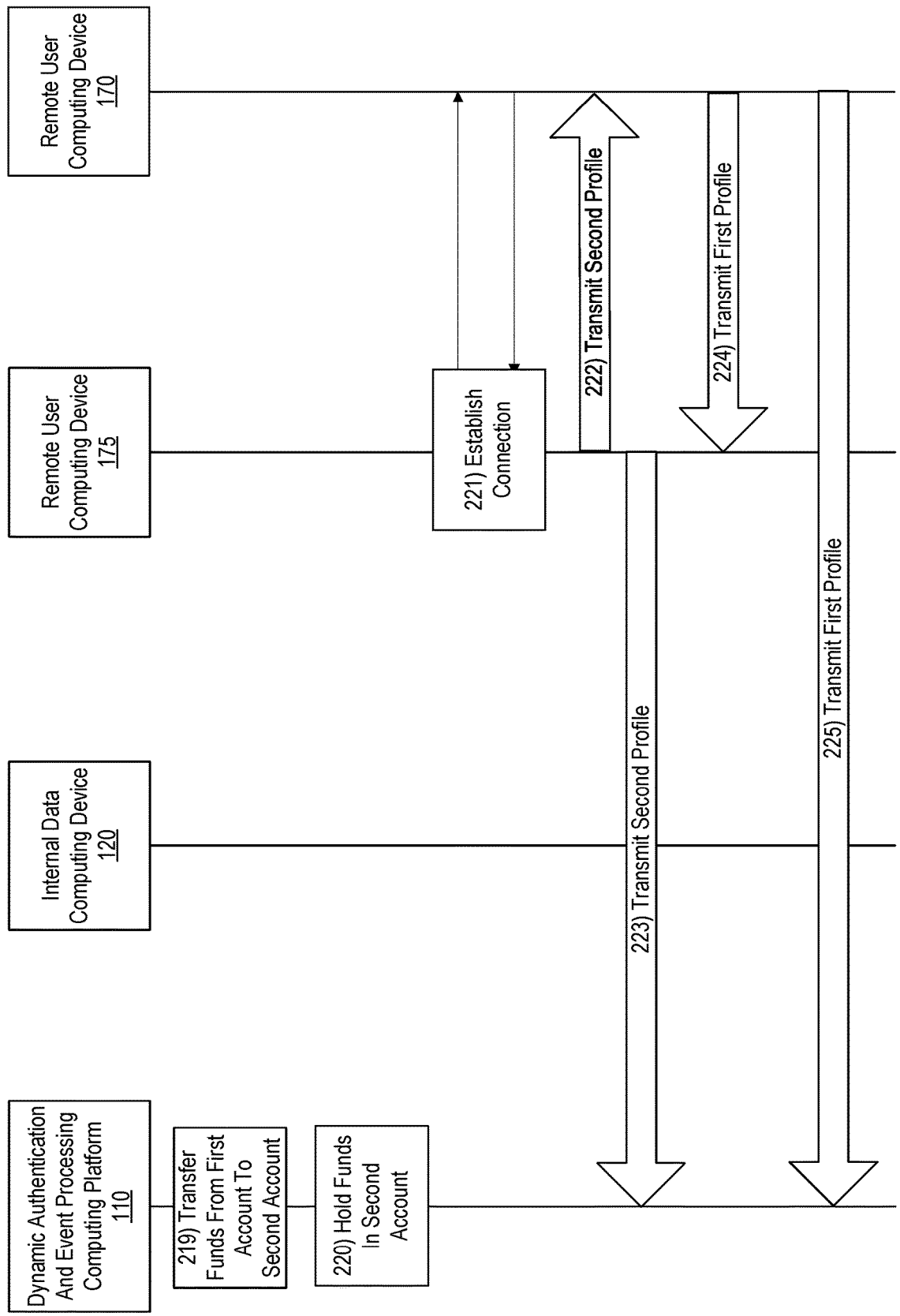

With reference to FIG. 2D, at step 219, and, in some examples, in response to event processing functionality being enabled, profiles being generated, or the like, an amount of funds may be transferred from a first account to a second, temporary account. For instance, if the first user is a buyer of the product, an amount of funds corresponding to the purchase price (or other amount) may be transferred from the first account to a second, temporary account. In some examples, the second, temporary account might not be associated with any of the users who are parties to the event being processed. Rather, the second, temporary account may be an account maintained or provided by an entity implementing the dynamic authentication and event processing computing platform 110.

At step 220, the funds may be held in the second account until a triggering event occurs. As discussed herein, a triggering event may include authorization of the event, cancellation of the event, expiration of a predetermined time period, or the like. The type of triggering event may control or determine a destination to which the funds may be transferred upon occurrence of the triggering event.

At step 221, a connection may be established between the remote user computing device 175 and the remote user computing device 170. For instance, a fourth wireless connection may be established between the remote user computing device 175 and the remote user computing device 170. Upon establishing the fourth wireless connection, a communication session may be initiated between the remote user computing device 170 and the remote user computing device 175.

At step 222, the second profile may be transmitted from the remote user computing device 175 to remote user computing device 170. For instance, during the communication session initiated when the fourth wireless connection was established, the second profile may be transmitted from remote user computing device 175 to remote user computing device 170.

At step 223, the second profile may also be transmitted from the remote user computing device 175 to the dynamic authentication and event processing computing platform 110. For instance, if the user has decided to authorize the event processing, the user may transmit his or her profile to the computing device of the other user and to the dynamic authentication and event processing computing platform 110 for authentication and processing. In some examples, transmitting the second profile to the dynamic authentication and event processing computing platform 110 may further including transmitting an indication that the second profile was transmitted from the remote user computing device 175 to the remote user computing device 170.

At step 224, the first profile may be transmitted from the remote user computing device 170 to remote user computing device 175. For instance, during the communication session initiated when the fourth wireless connection was established, the first profile may be transmitted from remote user computing device 170 to remote user computing device 175.

At step 225, the first profile may also be transmitted from the remote user computing device 170 to the dynamic authentication and event processing computing platform 110. For instance, if the user has decided to authorize the event processing, the user may transmit his or her profile to the computing device of the other user and to the dynamic authentication and event processing computing platform 110 for authentication and processing. In some examples, transmitting the first profile to the dynamic authentication and event processing computing platform 110 may further including transmitting an indication that the first profile was transmitted from the remote user computing device 170 to the remote user computing device 175.

Figure 2E:
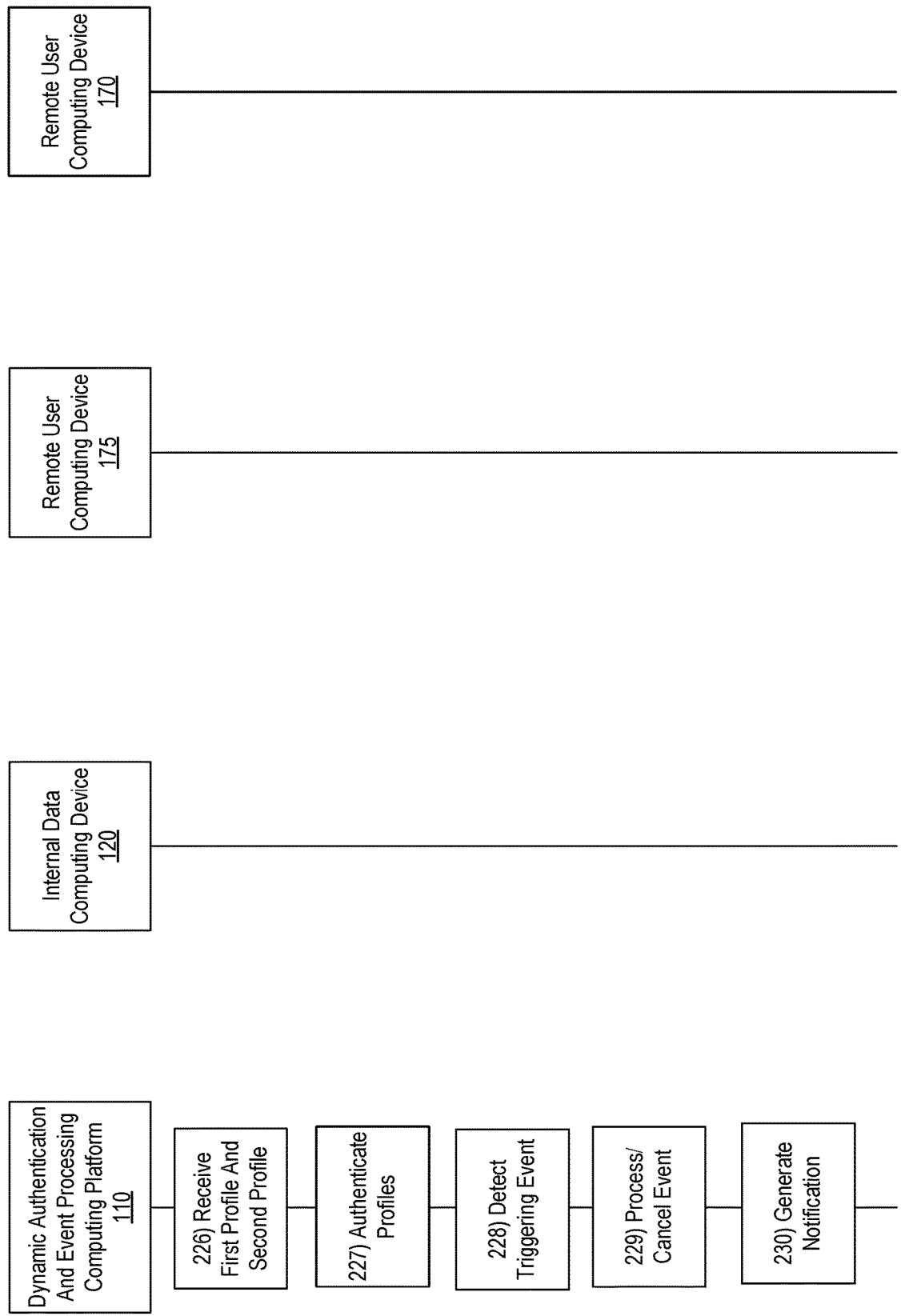

With reference to FIG. 2E, at step 226, the first profile and second profile may be received by the dynamic authentication and event processing computing platform 110. At step 227, the profiles may be authenticated. For instance, the received profiles may be compared to data associated with generation of the profiles to authenticate each user to the system.

At step 228, a triggering event may be detected. For instance, if the users are both authenticated via the profiles and have authorized the event, the triggering event may include event authentication and authorization and may be detected based on analysis of the received profiles.

At step 229, the event may be processed. For instance, if the event has been authorized, the amount of funds held in the second, temporary account may be transferred to a third account, different from the first account and the second account. The third account may be an account associated with a second user who may be the seller of the product being purchased. In examples in which one or more users has requested to cancel the event, the triggering event may include cancellation of the event and may cause the event to be cancelled at step 229. Accordingly, the amount of funds being held in the second, temporary account may be transferred back to the first account.

At step 230, a notification may be generated indicating whether the event was authorized and processed or cancelled.

Figure 2F:
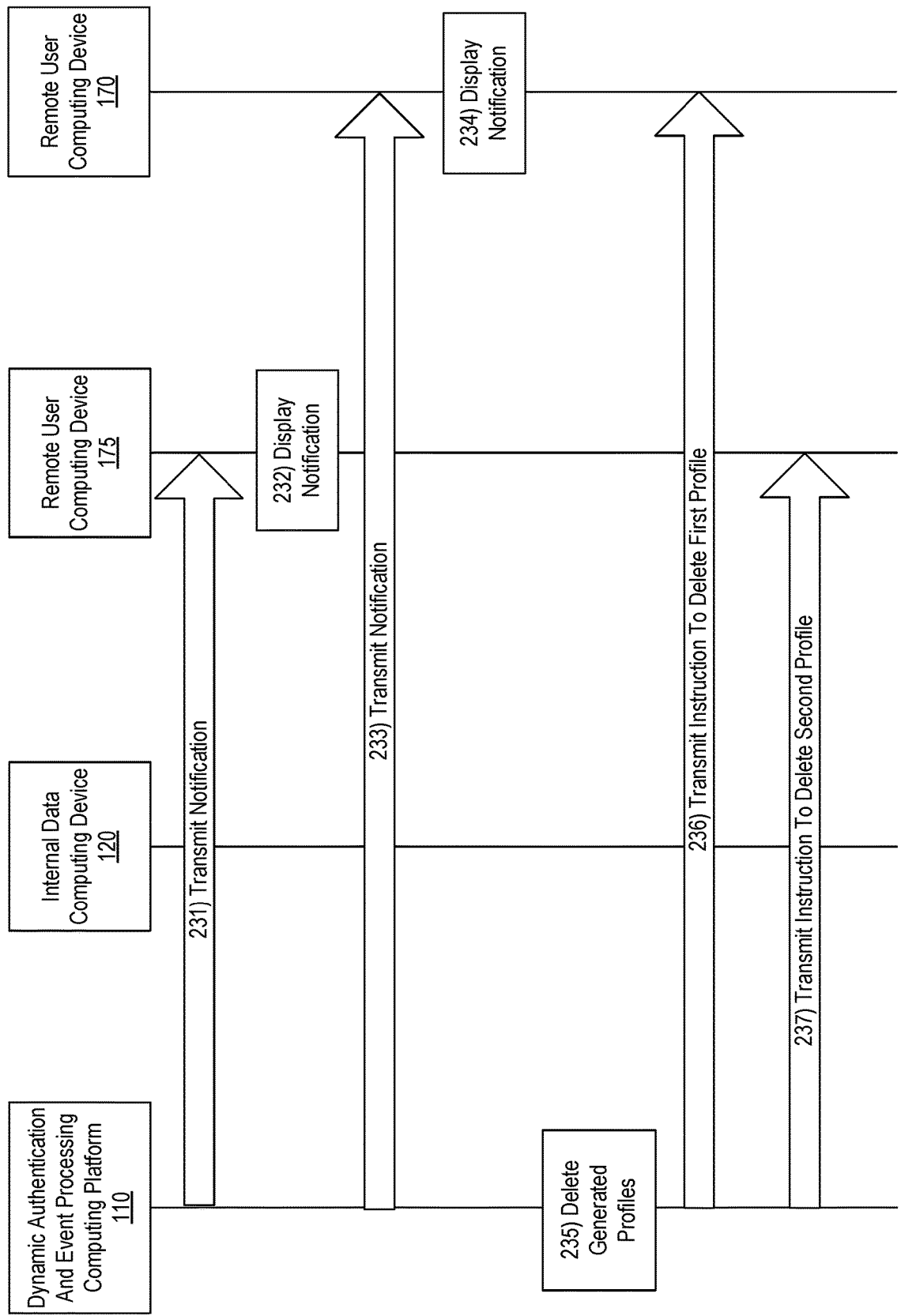

With reference to FIG. 2F, at step 231, the generated notification may be transmitted to remote user computing device 175 and, at step 232, the notification may be displayed on a display of remote user computing device 175.

At step 233, the generated notification may be transmitted to remote user computing device 170 and, at step 234, the notification may be displayed on a display of remote user computing device 170.

At step 235, the generated profiles may be deleted by the dynamic authentication and event processing computing platform 110. For instance, in arrangements in which the digital identities or profiles are generated for one-time user, the digital identities or profiles may be deleted after the event has been concluded (e.g., processed, cancelled, timed out, or the like).

At step 236, an instruction to delete the generated first profile may be transmitted to the remote user computing device 170 and the instruction may be executed by the device (e.g., automatically) to delete the profile that was transmitted to the remote user computing device 170.

At step 237, an instruction to delete the generated second profile may be transmitted to the remote user computing device 175 and the instruction may be executed by the device (e.g., automatically) to delete the profile that was transmitted to the remote user computing device 175.

Figure 3:
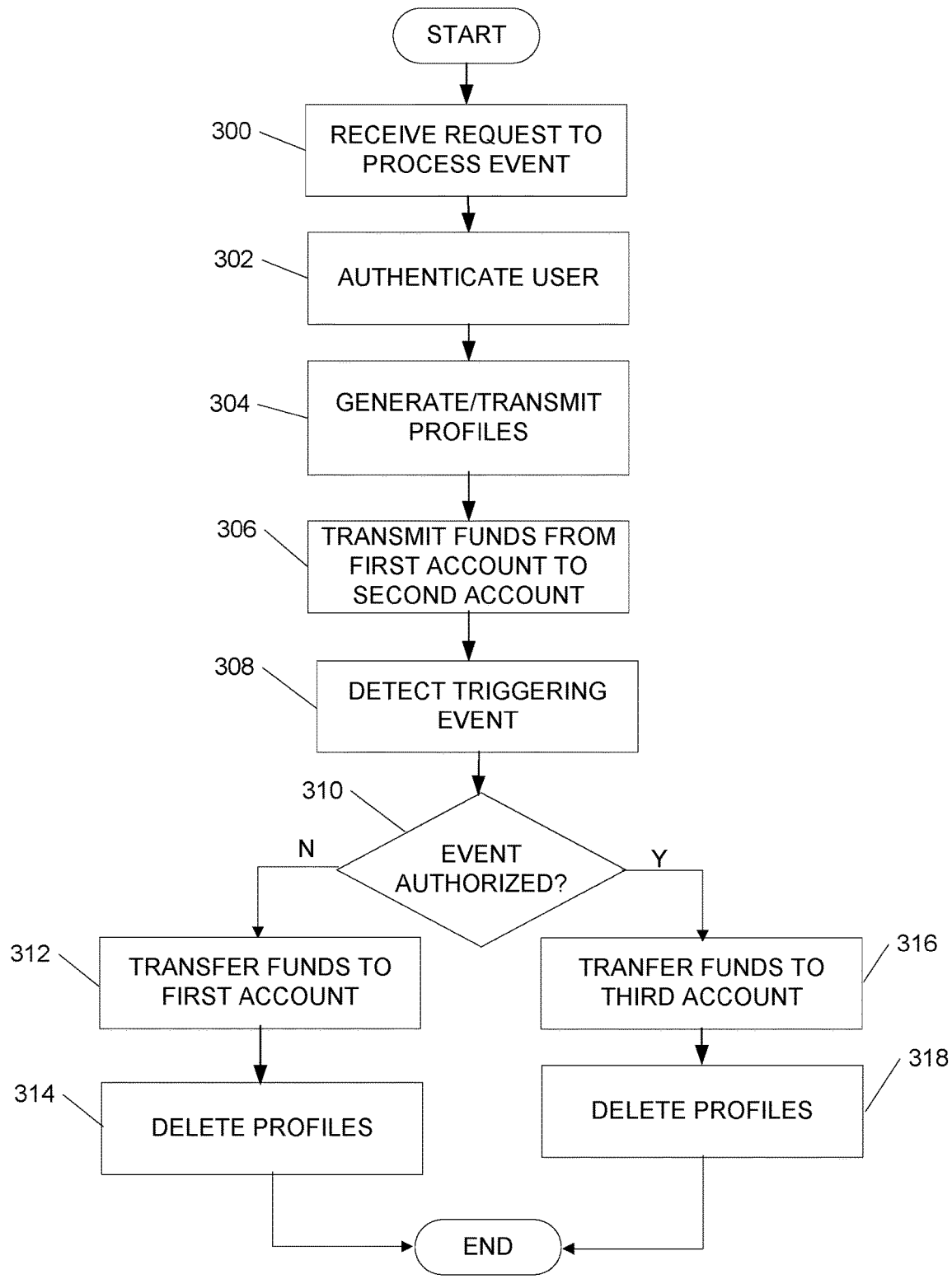
FIG. 3 depicts an illustrative method for implementing and using a system to perform dynamic authentication and event processing functions, according to one or more aspects described herein.

FIG. 3 is a flow chart illustrating one example method of providing dynamic authentication and event processing functions according to one or more aspects described herein. The processes illustrated in FIG. 5 are merely some example processes and functions. The steps shown may be performed in a different order, more steps may be added, or one or more steps may be omitted without departing from the invention.

At step 300, a request to process an event may be received by, for instance, the dynamic authentication and event processing computing platform 110. In some examples, the request may be received from a remote user computing device, such as a mobile device of a user. As discussed herein, the request may include details of the event, such as type, amount, parties, and the like.

At step 302, a user requesting event processing may be authenticated. For instance, user credentials (e.g., login information, password, or the like) may be received from the requesting user and compared to pre-stored data to authenticate the user.

At step 304, digital identities or profiles for each user who is a party to the event may be generated. In some examples, machine learning may be used to generate the digital identities or profiles that may be unique to each user. The profiles may then be used to authenticate the user in processing the event, authorize processing of the event, cancel the event, or the like.

At step 306, an amount of funds may be transferred from a first account of a first user to a second, temporary account. As discussed herein, the second, temporary account might not be associated with any of the users who are parties to the event. Instead, the second, temporary account may be associated with an entity. The amount of funds may be held in the second, temporary account until a triggering event is detected. In some examples, the system may continuously scan for triggering events in order to efficient process events (e.g., in real-time).

At step 308, a triggering event may be detected. At step 310, the triggering event may be analyzed, a type of triggering event may be determined, and a determination may be made as to whether the triggering event or triggering event type includes authorizing processing of the event. If not (e.g., if the triggering event is expiration of a predetermined time period, cancellation of the event, or the like), the funds may be transferred from the second, temporary account to the first account at step 312. At step 314, the generated digital identities or profiles may be deleted.

If, at step 310, the triggering event includes authorizing processing of the event, the event may be processed in step 316 and the amount of funds may be transferred from the second, temporary account to a third account, different from the first account and the second account. At step 318, the generated profiles may be deleted.

FIGS. 4A and 4B and FIGS. 5A and 5B illustrate example user interfaces that may be used with dynamic authentication and event processing functions according to one or more aspects described herein. FIGS. 4A and 4B illustrate two example user interfaces 400 and 450 including digital identities or profiles generated for two users who are parties to an event being processed. For instance, in response to a request to process an event, the dynamic authentication and event processing computing platform 110 may generate digital identities or profiles for each user who is a party to the event and may transmit the profiles to the respective user devices. Interface 400 includes a name of a first user who is a party to the event, as well as account information associated with the user, an amount associated with the event, and contact information. More or less information may be provided in user interface 400 without departing from the invention.

Interface 450 includes a profile associated with a second user who is a party to the event. The interface 450 includes a name of the second user, account information associated with the second user, an amount associated with the event and contact information. Again, more or less information may be provided in the user interface 450 without departing from the invention.

In some examples, in order to process the event, each user may transmit his or her respective profile to the other user, thereby authorizing processing of the event. Each profile may, in some examples, include tokenized information that provides authentication and/or authorization functions.

FIGS. 5A and 5B illustrate other example user interfaces 500 and 550 includes profiles that have been anonymized in accordance with one or more aspects described herein. For instance, interface 500 includes anonymized data for the user's name, account information and contact information. In example interface 500, the amount of funds associated with the transaction is shown. Similarly, interface 550 in FIG. 5B includes anonymized data for the user's name, account and contact information. The anonymized data may be linked to actual data (e.g., name, account number, and the like) in order to process the event.

As discussed herein, aspects described are directed to systems, devices and arrangement for providing improved security when processing events. For instance, when processing events between two individuals, rather than between an individual and an entity, the arrangements described herein provide additional protection against unauthorized activity, protect personal information, and the like. Although aspects described herein as discussed with respect to processing an event between two individuals, aspects may be used with events processed with more individuals or between an individual and an entity, as desired.

Aspects described herein may be used to provide additional protection to users who are parties to an event being processed by securing holding funds in an account independent of either user until the event has been processed or cancelled. For instance, users purchasing various types of items at various price points (e.g., $100, $25,000, $2,000, $100,000, or the like) can rely on the aspects described herein to provide security and protection against unauthorized activity by holding funds until both parties agree to process the event. Accordingly, the seller has the security of knowing the funds are available and being held by an independent entity who is not a party to the event, and the buy has the security of being able to review the product before releasing the funds to the seller.

In some examples, aspects directed to these dynamic authentication and event processing functions may be provided via an application executing on a computing device, such as a mobile device of one or more users involved in the event. Accordingly, in order to initiate one or more event processing functions, the user may activate the application (e.g., execute the application) to begin and facilitate the process. In some examples, a profile may be displayed to a user via the application.

The system may further provide a user with one or more options available. For instance, a user may opt in or out of the dynamic authentication and event processing functions described herein. In another example, one or more users may select to have some or all data anonymized to further protect the user's privacy. In still other examples, the user may provide thresholds for types of items, amounts of purchases, and the like, that maybe facilitated via the arrangements discussed herein. In some examples, one or more parties to an event may identify criteria (e.g., in advance of the event being processed or initiated) for which a user may cancel the event processing. Accordingly, both parties may understand what criteria may be used to cancel the event in advance and may understand that a user cannot arbitrarily cancel an event.

As discussed above, in some examples, the profile or data therein may be tokenized to provide a digital identifier or token that can be used by the user to authenticate the user or authorize or cancel a transaction. Accordingly, the tokenized profile or data transmitted to each user in his or her respective profile may collaborate (e.g., each profile may be needed to complete the event processing) to process an event (e.g., provide authentication and/or authorization).

In some examples, use of the profiles to authenticate a user and authorize an event may be coupled with additional security measures. For instance, a challenge question or other request for data may be provided to a user when a user attempts to use the profile to authorize a transaction. In some examples, the challenge question may be pre-stored and the response data may be provided by the user, compared to the pre-stored data, and used to then authenticate the user and/or authorize the event.

In some examples in which a profile may be used for more than one event, a personal identification number or other unique identifier may be provided to the user. In some examples, in order to use the profile to authenticate and/or authorize the transaction, the personal identification number or other unique identifier must be provided to the system, compared to pre-stored data and, if a match exists, the user may be authenticated and/or the event processed.

In some examples, initiation of processing an event may be received from a user device of a first user. In some arrangements, two or more users (e.g., parties to the event) may request event processing from his or her respective computing devices. In some arrangements, the request for event processing may prompt one or more users to input parameters for the event, such as limitations or thresholds for amount, criteria for cancelling the event, and the like.

As discussed herein, one or more triggering events may be used to initiate transfer of funds, deletion of profiles, and the like. For instance, expiration of a predetermined time period or meeting predetermined criteria may cause the system to automatically transfer funds (e.g., from the second, temporary account to one of the first account or the third account). In some examples, more than one triggering event may be used to transfer the entirety of the amount of funds. For instance, first portion of the funds may be transferred upon detection of a first triggering event and the remainder may be transferred upon detection of a second triggering event. For instance, a buyer receiving notification that a product has shipped from the seller may be a first triggering event that causes the system to transfer a first portion of the funds. Upon delivery of the package (e.g., as detected by the system) the system may automatically transfer the remainder of the funds. In another example, the triggering event may include the buyer providing an indication that the goods have arrived and are in an acceptable condition. Various other example triggering events may be used without departing from the invention.

In some arrangements, any disputes that may arise from events processed via the system may also be resolved via the system. In some examples, the system may include different rule sets for evaluating and resolving disputers. The rule set implemented may be based on a type of event, amount of event, or the like. In some examples, machine learning may be used to generate rules for resolving a dispute and/or for evaluating circumstances of a current dispute and generating an output for resolving the dispute.

The above-described examples are merely some example arrangements in which the systems described herein may be used. Various other arrangements employing aspects described herein may be used without departing from the invention.

Figure 6:
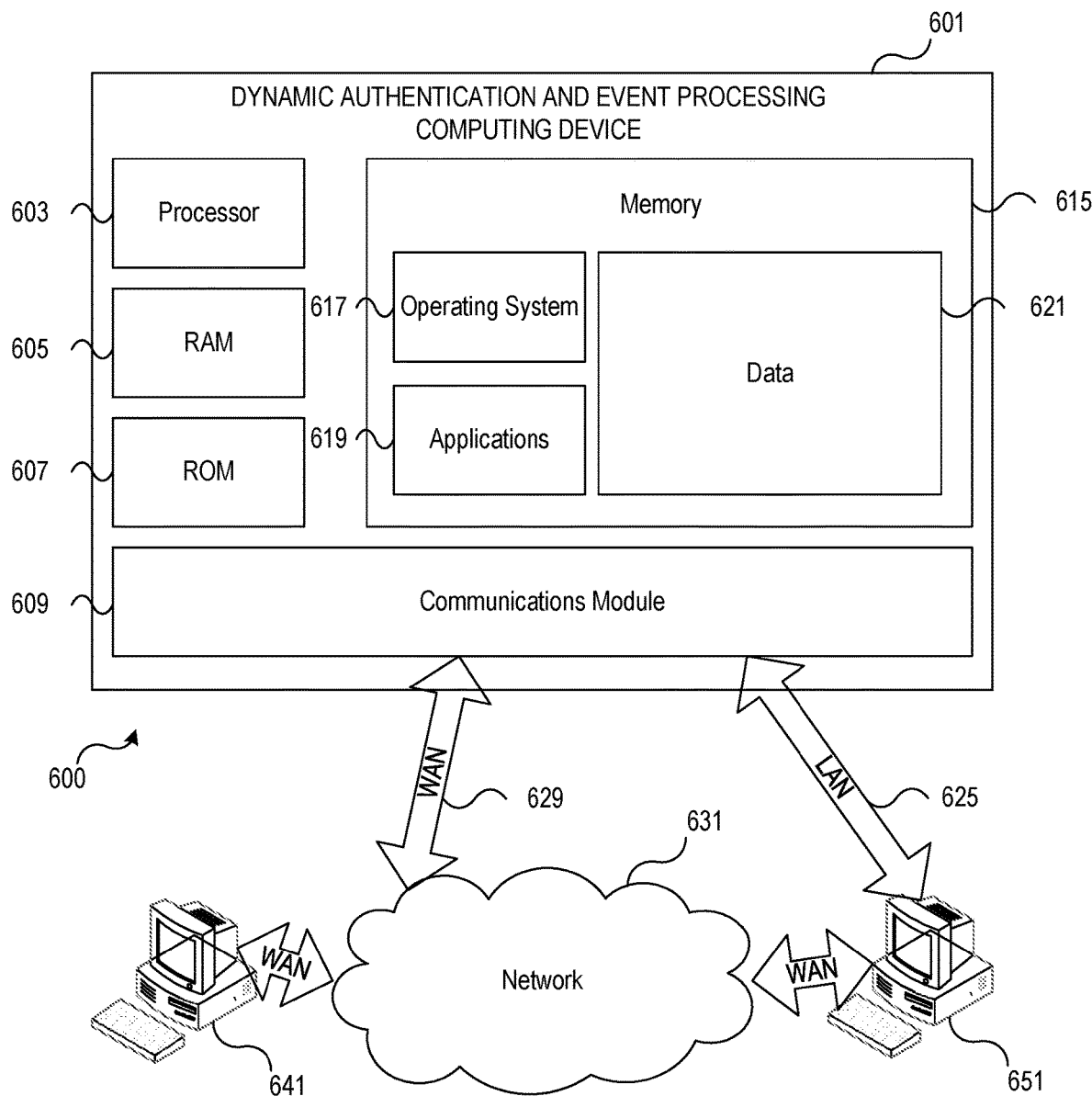
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic authentication and event processing computing device 601 having processor 603 for controlling overall operation of dynamic authentication and event processing computing device 601 and its associated components, including Random Access Memory (RAM) 605, Read-Only Memory (ROM) 607, communications module 609, and memory 615. Dynamic authentication and event processing computing device 601 may include a variety of computer readable media. Computer readable media may be any available media that may be accessed by dynamic authentication and event processing computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic authentication and event processing computing device 601. Such a processor may execute computer-executable instructions stored on a computer-readable medium.

Software may be stored within memory 615 and/or storage to provide instructions to processor 603 for enabling dynamic authentication and event processing computing device 601 to perform various functions as discussed herein. For example, memory 615 may store software used by dynamic authentication and event processing computing device 601, such as operating system 617, application programs 619, and associated database 621. Also, some or all of the computer executable instructions for dynamic authentication and event processing computing device 601 may be embodied in hardware or firmware. Although not shown, RAM 605 may include one or more applications representing the application data stored in RAM 605 while dynamic authentication and event processing computing device 601 is on and corresponding software applications (e.g., software tasks) are running on dynamic authentication and event processing computing device 601.

Communications module 609 may include a microphone, keypad, touch screen, and/or stylus through which a user of dynamic authentication and event processing computing device 601 may provide input, and may also include one or more of a speaker for providing audio output and a video display device for providing textual, audiovisual and/or graphical output. Computing system environment 600 may also include optical scanners (not shown).

Dynamic authentication and event processing computing device 601 may operate in a networked environment supporting connections to one or more remote computing devices, such as computing devices 641 and 651. Computing devices 641 and 651 may be personal computing devices or servers that include any or all of the elements described above relative to dynamic authentication and event processing computing device 601.

The network connections depicted in FIG. 6 may include Local Area Network (LAN) 625 and Wide Area Network (WAN) 629, as well as other networks. When used in a LAN networking environment, dynamic authentication and event processing computing device 601 may be connected to LAN 625 through a network interface or adapter in communications module 609. When used in a WAN networking environment, dynamic authentication and event processing computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 7:
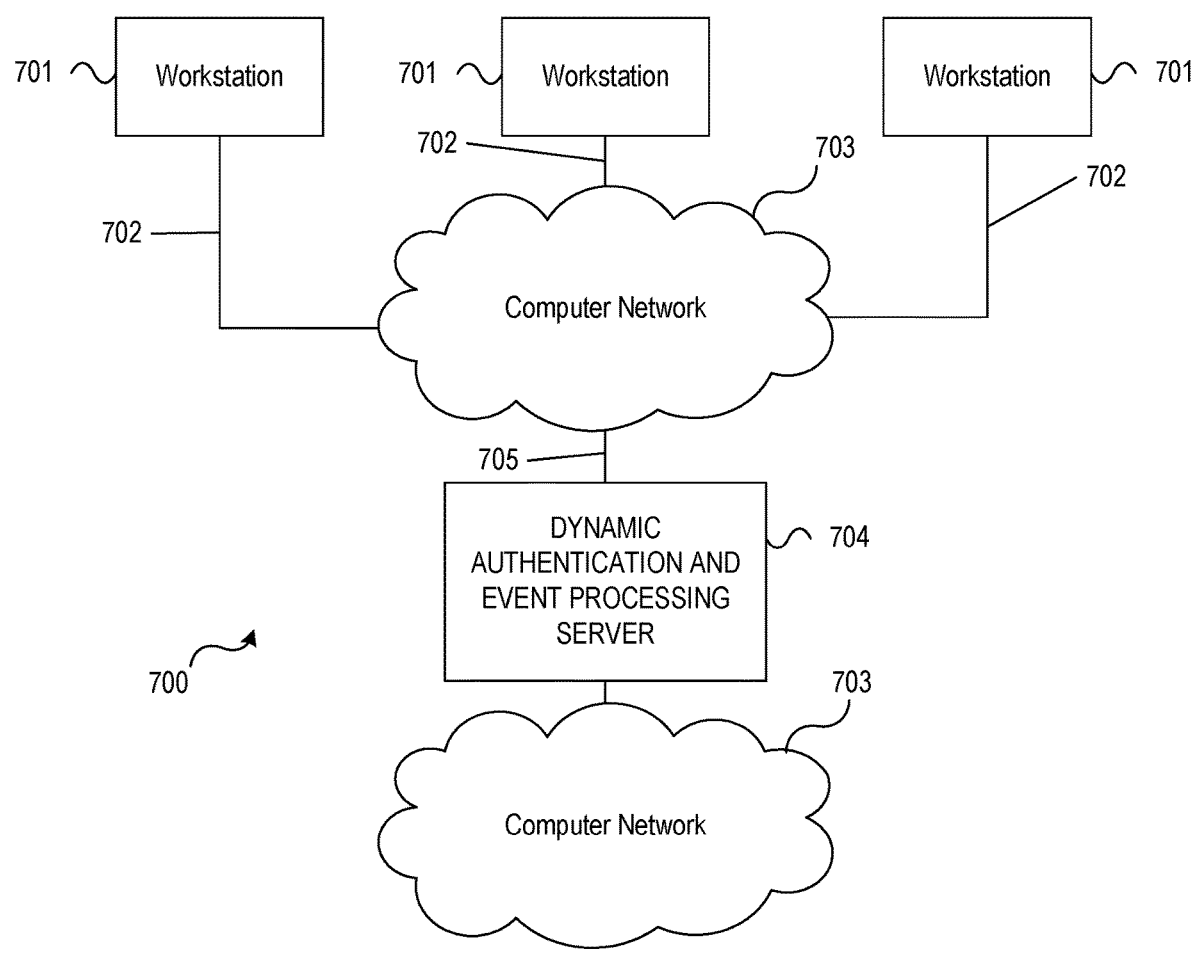
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic authentication and event processing server 704. In system 700, dynamic authentication and event processing server 704 may be a server, processor, computer, or data processing device, or combination of the same, configured to perform the functions and/or processes described herein. Server 704 may be used to receive requests to process events, authenticate a user, generate one or more user profiles, receive user profile data, authenticate and authorize event processing, cancel event processing, delete profiles, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic authentication and event processing server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:
1. A computing platform, comprising:
at least one processor;
a communication interface communicatively coupled to the at least one processor; and memory storing computer-readable instructions that, when executed by the at least one processor, cause the computing platform to:

receive a request to process an event, the request to process the event including event details;

responsive to receiving the request to process the event, executing an instruction to transfer an amount of funds from a first account to a second, temporary account;

generate, based on machine learning datasets and based on the received request to process the event, a first profile for a first user who is a first party to the event and a second profile for a second user who is a second party, the first user profile being unique to the first user and including information identifying the first user, account information of the first user, and an amount associated with the event, and the second user profile being unique to the second user and including information identifying the second user, account information of the second user, and the amount associated with the event;

anonymize data in the first profile for the first user including generating an identifier representing the data in the first profile for the first user;

transmit, to a first user device of the first user, the first profile for the first user including the identifier representing the data in the first profile for the first user;

transmit, to a second user device of the second user, the second profile for the second user;

receive a first authorization to process the event, the first authorization including the identifier representing the data from the first profile for the first user;

execute a look-up function based on the identifier to identify the anonymized data;

determine whether a triggering event has occurred;

responsive to determining that the triggering event has occurred, analyze the triggering event to determine a type of triggering event;

responsive to determining that the triggering event is a first type of triggering event, and based, at least in part, on the identified anonymized data, transferring the amount of funds from the second, temporary account to a third account different from the first account and the second, temporary account, the first type of triggering event including a second authorization, the second authorization including approval to proceed with transferring the amount of funds based on at least receiving, from the first user device of the first user the first user profile and from the second user device of the second user the second user profile, the first user profile and the second user profiles being tokens to authenticate the first party and the second party; and responsive to determining that the triggering event is a second type of triggering event, denying the request to process the event and transferring the amount of funds from the second, temporary account to the first account, wherein the second type of triggering event includes a request to cancel the event.

2. The computing platform of claim 1, wherein anonymizing data in the first profile of the first user is performed prior to transmitting the first profile for the first user to the first user device of the first user.

3. The computing platform of claim 1, further including instructions that, when executed, cause the computing platform to:

prior to transmitting the second profile for the second user to the second user device of the second user, anonymizing data in the second profile for the second user.

4. The computing platform of claim 1, further including instructions that, when executed, cause the computing platform to:

after one of: transferring the amount of funds from the second, temporary account to the third account and transferring the amount of funds from the second, temporary account to the first account, deleting the generated first profile for the first user and second profile for the second user to prevent them from being used as authenticating data in subsequent requests to process events.

5. The computing platform of claim 1, wherein the first account is associated with the first user and the third account is associated with the second user.

6. The computing platform of claim 5, wherein the second, temporary account is associated with an entity.

7. The computing platform of claim 1, wherein receiving the first authorization to process the event includes receiving an indication that the first profile of the first user was transmitted from the first user device of the first user to the second user device of the second user.

8. A method, comprising:

at a computing platform comprising at least one processor, memory, and a communication interface:

receiving, by the at least one processor and via the communication interface, a request to process an event, the request to process the event including event details;

responsive to receiving the request to process the event, executing, by the at least one processor, an instruction to transfer an amount of funds from a first account to a second, temporary account;

generating, by the at least one processor and based on machine learning datasets, and based on the received request to process the event, a first profile for a first user who is a first party to the event and a second profile for a second user who is a second party, the first user profile being unique to the first user and including information identifying the first user, account information of the first user, and an amount associated with the event, and the second user profile being unique to the second user and including information identifying the second user, account information of the second user, and the amount associated with the event;

anonymizing, by the at least one processor, data in the first profile for the first user including generating an identifier representing the data in the first profile for the first user transmitting, by the at least one processor and to a first user device of the first user via the communication interface, the first profile for first user including the identifier representing the data in the first profile for the first user;

transmitting, by the at least one processor and to a second user device of the second user via the communication interface, the second profile for the second user;

receiving, by the at least one processor and via the communication interface, a first authorization to process the event, the first authorization including the identifier representing the data from the first profile for the first user;

executing, by the at least one processor, a look-up function based on the identifier to identify the anonymized data;
determining, by the at least one processor, whether a triggering event has occurred;
responsive to determining that the triggering event has occurred, analyzing, by the at least one processor, the triggering event to determine a type of triggering event;
responsive to determining that the triggering event is a first type of triggering event, and based, at least in part, on the identified anonymized data, transferring, by the at least one processor, the amount of funds from the second, temporary account to a third account different from the first account and the second, temporary account, the first type of triggering event including a second authorization, the second authorization including approval to proceed with transferring the amount of funds based on at least receiving, from the first user device of the first user the first user profile and from the second user device of the second user the second user profile, the first user profile and the second user profiles being tokens to authenticate the first party and the second party; and
responsive to determining that the triggering event is a second type of triggering event, denying, by the at least one processor, the request to process the event and transferring the amount of funds from the second, temporary account to the first account, wherein the second type of triggering event includes a request to cancel the event.

9. The method of claim 8, wherein anonymizing data in the first profile of the first user is performed prior to transmitting the first user profile for the first user to the first user device of the first user.

10. The method of claim 8, further including:
prior to transmitting the second profile for the second user to the second user device of the second user, anonymizing data in the second profile for the second user.

11. The method of claim 8, further including:
after one of: transferring the amount of funds from the second, temporary account to the third account and transferring the amount of funds from the second, temporary account to the first account, deleting the generated first profile for the first user and second profile for the second user to prevent them from being used as authenticating data in subsequent requests to process events.

12. The method of claim 8, wherein the first account is associated with the first user and the third account is associated with the second user.

13. The method of claim 12, wherein the second, temporary account is associated with an entity.

14. The method of claim 8, wherein receiving the first authorization to process the event includes receiving an indication that the first profile of the first user was transmitted from the first user device of the first user to the second user device of the second user.

15. One or more non-transitory computer-readable media storing instructions that, when executed by a computing platform comprising at least one processor, memory, and a communication interface, cause the computing platform to:
receive a request to process an event, the request to process the event including event details;
responsive to receiving the request to process the event, executing an instruction to transfer an amount of funds from a first account to a second, temporary account;
generate, based on machine learning datasets, and based on the received request to process the event, a first profile for a first user who is a first party to the event and a second profile for a second user who is a second party, the first user profile being unique to the first user and including information identifying the first user, account information of the first user, and an amount associated with the event, and the second user profile being unique to the second user and including information identifying the second user, account information of the second user, and the amount associated with the event;
anonymize data in the first profile for the first user including generating an identifier representing the data in the first profile for the first user;
transmit, to a first user device of the first user, the first profile for the first user including the identifier representing the data in the first profile for the first user;
transmit, to a second user device of the second user, the second profile for the second user;
receive a first authorization to process the event, the first authorization including the identifier representing the data from the first profile for the first user;
execute a look-up function based on the identifier to identify the anonymize data;
determine whether a triggering event has occurred;
responsive to determining that the triggering event has occurred, analyze the triggering event to determine a type of triggering event;
responsive to determining that the triggering event is a first type of triggering event, and based, at least in part, on the identified anonymized data, transferring the amount of funds from the second, temporary account to a third account different from the first account and the second, temporary account, the first type of triggering event including a second authorization, the second authorization including approval to proceed with transferring the amount of funds based on at least receiving, from the first user device of the first user the first user profile and from the second user device of the second user the second user profile, the first user profile and the second user profiles being tokens to authenticate the first party and the second party; and
responsive to determining that the triggering event is a second type of triggering event, denying the request to process the event and transferring the amount of funds from the second, temporary account to the first account, wherein the second type of triggering event includes a request to cancel the event.

16. The one or more non-transitory computer-readable media of claim 15, wherein anonymizing data in the first profile of the first user is performed prior to transmitting the first profile for the first user to the first user device of the first user.

17. The one or more non-transitory computer-readable media of claim 15, further including instructions that, when executed, cause the computing platform to:
prior to transmitting the second profile for the second user to the second user device of the second user, anonymizing data in the second profile for the second user.

18. The one or more non-transitory computer-readable media of claim 15, further including instructions that, when executed, cause the computing platform to:

after one of: transferring the amount of funds from the second, temporary account to the third account and transferring the amount of funds from the second, temporary account to the first account, deleting the generated first profile for the first user and second profile for the second user to prevent them from being used as authenticating data in subsequent requests to process events.

19. The one or more non-transitory computer-readable media of claim 15, wherein the first account is associated with the first user and the third account is associated with the second user.

20. The one or more non-transitory computer-readable media of claim 19, wherein the second, temporary account is associated with an entity.

21. The one or more non-transitory computer-readable media of claim 15, wherein receiving the first authorization to process the event includes receiving an indication that the first profile of the first user was transmitted from the first user device of the first user to the second user device of the second user.

\* \* \* \* \*